United States Patent
Cho et al.

(10) Patent No.: US 8,450,510 B2
(45) Date of Patent: May 28, 2013

(54) AMINE BRIDGED METALLOCENE CATALYST, METHOD FOR PREPARING THEREOF AND METHOD FOR POLYMERIZING ETHYLENE-ALPHA OLEFIN COPOLYMER USING AMINE BRIDGED METALLOCENE CATALYST

(75) Inventors: Min-Seok Cho, Daejeon (KR); Nicola Maggiarosa, Daejeon (KR); Ki-Soo Lee, Daejeon (KR); Heon-Yong Kwon, Daejeon (KR); Jong-Sang Park, Daejeon (KR); Joon-Hee Cho, Daejeon (KR); Yong-Ho Lee, Incheon (KR); Byung-Ryul Lee, Seoul (KR); Seon-Kyoung Kim, Yongin-si (KR); Dae-Sik Hong, Gunpo-si (KR)

(73) Assignee: LG Chem, Ltd., Seoul (KR)

( * ) Notice: Subject to any disclaimer, the term of this patent is extended or adjusted under 35 U.S.C. 154(b) by 275 days.

(21) Appl. No.: 12/865,663

(22) PCT Filed: Jan. 30, 2009

(86) PCT No.: PCT/KR2009/000461
§ 371 (c)(1),
(2), (4) Date: Jul. 30, 2010

(87) PCT Pub. No.: WO2009/096733
PCT Pub. Date: Aug. 6, 2009

(65) Prior Publication Data
US 2010/0324321 A1    Dec. 23, 2010

(30) Foreign Application Priority Data
Jan. 31, 2008 (KR) .................. 10-2008-0010105

(51) Int. Cl.
C07F 17/00 (2006.01)
C07F 11/00 (2006.01)
C07F 7/00 (2006.01)

(52) U.S. Cl.
USPC ................................ 556/53; 556/56; 556/63

(58) Field of Classification Search
USPC .............................................. 556/53, 56, 63
See application file for complete search history.

(56) References Cited

U.S. PATENT DOCUMENTS

| 5,470,811 A | 11/1995 | Jejelowo et al. |
| 5,580,939 A | 12/1996 | Ewen et al. |
| 2006/0069221 A1 | 3/2006 | Lee et al. |

FOREIGN PATENT DOCUMENTS

| CN | 1697843 | 11/2005 |
| EP | 0 729 984 A1 | 9/1996 |
| EP | 1 138 687 A1 | 10/2001 |
| JP | 09-041255 | 2/1997 |
| JP | 3823326 | 7/2006 |
| KR | 10-2006-0028603 A | 3/2006 |
| KR | 10-2006-0091528 A | 8/2006 |
| WO | WO 2006/033527 A1 | 3/2006 |
| WO | WO 2006/088306 A1 | 8/2006 |

OTHER PUBLICATIONS

Machine Language translation of JP 09-041255 (Sep. 14, 2012).*

* cited by examiner

Primary Examiner — Porfirio Nazario Gonzalez
(74) Attorney, Agent, or Firm — McKenna Long & Aldridge, LLP

(57) ABSTRACT

The present invention relates to an amine bridged metallocene catalyst, a method for producing the same, and a method for producing an ethylene-alpha olefin copolymer, which comprises polymerizing ethylene and alpha olefin in the presence of an olefin polymerization catalyst composition including a metallocene catalyst. The amine bridged metallocene catalyst may be produced by reacting one or more of substituted or unsubstituted cyclopentadiene and substituted or unsubstituted fluorene with amine to bridge them with nitrogen, and reacting them with a transition metal to coordinate them.

11 Claims, No Drawings ved that the ratio is 0.02 (1997 Apr. 18. US
AMINE BRIDGED METALLOCENE CATALYST, METHOD FOR PREPARING THEREOF AND METHOD FOR POLYMERIZING ETHYLENE-ALPHA OLEFIN COPOLYMER USING AMINE BRIDGED METALLOCENE CATALYST This application is a 35 U.S.C. §371 National Stage entry of International Application No. PCT/KR2009/000461, filed on Jan. 30, 2009, and claims priority to Korean Application No. 10-2008-0010105, filed on Jan. 31, 2008, which are all hereby incorporated by reference in their entireties.

TECHNICAL FIELD

The present invention relates to an amine bridged metallocene catalyst, a method for producing the same, and a method for producing an ethylene-alpha olefin copolymer, which comprises polymerizing ethylene and alpha olefin in the presence of an olefin polymerization catalyst composition including a metallocene catalyst.

This application claims priority from Korean Patent Application No. 10-2008-0010105 filed on Jan. 31, 2008 in the Korean Intellectual Property Office, the disclosure of which is incorporated herein by reference in its entirety.

BACKGROUND ART

As a ligand, a Group 4 transition metal compound that has one or two cyclopentadienyl groups may be activated by using methyl aluminoxane or a boron compound to be used as a catalyst in olefin polymerization (U.S. Pat. No. 5,580,939; Macromol. Chem. Phys. vol. 197, 1996 3707-3945). This catalyst shows an intrinsic characteristic that is not realized by a known Ziegler-Natta catalyst.

That is, in the polymer that is obtained by using this catalyst, the molecular weight distribution is narrow, the reactivity to a second monomer such as alpha olefins or cyclic olefins is good, and a second monomer distribution of the polymer is uniform. In addition, by changing a substituent of a cyclopentadienyl ligand in a metallocene catalyst, when alpha olefins are polymerized, stereo selectivity of the polymer may be controlled (Angew. Chem. Int. Ed. Engl. 1995, 34, 1143), and when ethylene and another olefin are copolymerized, the degree of copolymerization, a molecular weight, a second monomer distribution and the like may be easily controlled (U.S. Pat. No. 5,470,811).

In accordance with the development of a catalyst system, effort has been continuously made to find a catalyst that is useful to produce LLDPE, VLDPE, EPM, and EPDM that are a copolymer of ethylene and alpha olefins, cyclic olefin copolymers (COC) that are a copolymer of ethylene and cyclic olefins or alpha olefins and cyclic olefins, and a copolymer of ethylene and alpha olefins and styrene. Conditions of the catalyst required to produce the above products comprise excellent activity, high reactivity to second monomers, and the production of polymers having the uniform distribution of second monomers.

Meanwhile, since the metallocene catalyst is expensive as compared to the known Ziegler-Natta catalyst, it is economic when the activity is excellent. If the reactivity to second monomers is good, even though a small amount of second monomers is added, a polymer that comprises a great amount of second monomers may be obtained.

Many researchers have studied various catalysts, resulting in the finding that a bridged catalyst has good reactivity to second monomers. According to the study by F. J. Karol, in order to produce LLDPE products having the density of 0.93 g/cc using hexene as a second monomer, in the case of the bridged catalyst, a ratio of ethylene and hexene may be in the range of 0.004~0.005, but in the case of the non-bridged catalyst, it is required that the ratio is 0.02 (1997 Apr. 18. US Palm Coast, Fla., Polymer Reaction Engineering Foundation Conference).

In addition, the bridged catalyst has been actively studied because a molecular structure of a propylene polymer may be controlled according to the symmetry of the molecules thereof. Therefore, in order to produce the above copolymer, the bridged catalyst has been watched with interest.

The bridged catalyst that has been studied until now may be roughly classified into three categories according to the shape of bridge. One of them is a catalyst where two cyclopentadienyl ligands are connected by an allylenedibridge according to a reaction of electron-philic body such as alkyl halides and indene or fluorene, second is a silicon-bridged catalyst that is connected by —$SiR_2$—, and third is a methylene-bridged catalyst that is obtained by a reaction of fulbene and indene or fluorene.

JP No. 3823326 suggests that dimethylbis (substituted cyclopentadienyl)silane is produced by reacting substituted cyclopentadiene and dimethyl dihalosilane with each other, and a metallocene compound is produced by reacting dimethylbis (substituted cyclopentadienyl)silane and a halogen compound of a transition metal with each other.

In addition, Korean Patent No. 0746676 suggests a method for producing a metallocene compound that comprises a substituted cyclopentadienyl group and a (substituted)fluorenyl group and has a structure where these groups are bridged by a hydrocarbon group and the like.

DISCLOSURE OF INVENTION

Technical Problem

As described above, a metallocene compound that has a structure bridged with a hydrocarbon group or a silicon group and a method for producing the same are known, but an amine bridged metallocene compound and a method for producing the same are not known. Therefore, the present invention provides an amine bridged metallocene catalyst and a method for producing the same, and it is an object of the present invention to provide a method for producing an ethylene-alpha olefin copolymer, which comprises polymerizing ethylene and alpha olefin by using the metallocene catalyst.

Technical Solution

In order to accomplish the above object of the present invention, the present invention provides a method for producing a metallocene catalyst, which comprises the steps of reacting two substituted or unsubstituted cyclopentadienyl groups, one substituted or unsubstituted cyclopentadienyl group and one substituted or unsubstituted fluorenyl group, or two substituted or unsubstituted fluorenyl groups with amine to crosslink them with nitrogen, and reacting them with a transition metal to coordinate them.

In addition, the present invention provides a novel amine bridged metallocene compound.

In addition, the present invention provides a method for producing an ethylene-alpha olefin copolymer, which comprises the steps of polymerizing ethylene and alpha olefin in the presence of an olefin polymerization catalyst composition including a metallocene catalyst.

Advantageous Effects

According to the present invention, there are advantages in that a metallocene compound in which a cyclopentadienyl group and/or a fluorenyl group are bridged with amine is easily produced and an ethylene-alpha olefin copolymer is easily produced by using the same.

BEST MODE FOR CARRYING OUT THE INVENTION

Hereinafter, the present invention will be described in detail.

The present invention provides a method for producing a metallocene catalyst, which comprises the steps of reacting one or more of compounds that are represented by the following Formula 1 and Formula 2 with a compound that is represented by the following Formula 3 to bridge them with nitrogen; and reacting them with a compound that is represented by the following Formula 4 to coordinate them:

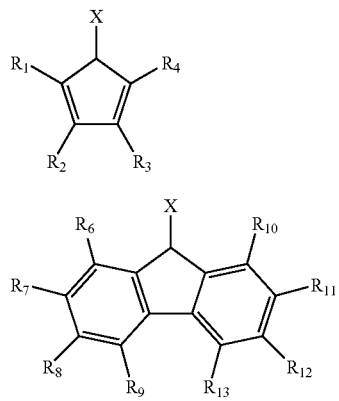

[Formula 1]

[Formula 2]

In Formula 1 and Formula 2, $R_1, R_2, R_3, R_4, R_6, R_7, R_8, R_9, R_{10}, R_{11}, R_{12}$ and $R_{13}$ may be the same or different from each other, and are each independently hydrogen; an alkyl group that is unsubstituted or substituted with a halo group and has 1 to 11 carbon atoms; an aryl group that is unsubstituted or substituted with a fluoroalkyl, nitro, sulfonate or halo group and has 6 to 20 carbon atoms; an arylalkyl group having 7 to 20 carbon atoms; an alkylaryl group having 7 to 20 carbon atoms; a nitro group; a sulfonate group; a siloxyl group; or —$OSiZ_3$, Z is phenyl; a straight- or branched-chained hydrocarbon having 1 to 4 carbon atoms; a hydrocarbylene group; or —$(BO)_zY$, B is an alkylene group having 2 to 4 carbon atoms or an allylene group having 6 to 20 carbon atoms, Y is an alkyl group having 1 to 11 carbon atoms, a phenyl group, a biphenyl group, or a naphthyl group, and z is an integer in the range of 1 to 4, X is a halogen atom such as chlorine, bromine and iodine, or a thallium atom,

   [Formula 3]

wherein $R_5$ is an alkyl group having 1 to 11 carbon atoms; an aryl group that is unsubstituted or substituted with a fluoroalkyl, nitro, sulfonate or halo group and has 6 to 20 carbon atoms; an arylalkyl group having 7 to 20 carbon atoms; or an alkylaryl group having 7 to 20 carbon atoms, and preferably phenylethyl,

   [Formula 4]

wherein

M is a Group 3 to 11 transition metal, and preferably Group 4 transition metal such as titanium, zirconium, and hafnium, A is Cl or Br, X is an integer in the range of 2 to 4, r is an integer in the range of 1 to 4, and Q is THF (tetrahydrofuran), $Et_2O$ (diethylether), or DME (Dimethyl Ether), and preferably THF.

In the case of when $R_1, R_2, R_3, R_4, R_5, R_6, R_7, R_8, R_9, R_{10}, R_{11}, R_{12}$ or $R_{13}$ in Formula 1 to Formula 3 is an aryl group, it is preferable that the aryl group is a phenyl group, a biphenyl group, a naphthyl group, an anthracyl group or a phenanthracyl group.

The amine bridged metallocene catalyst that is produced by using the above production method may be any one of the following Formula 5 to Formula 7.

The present invention provides an amine bridged metallocene catalyst that is represented by any one of the following Formula 5 to Formula 7.

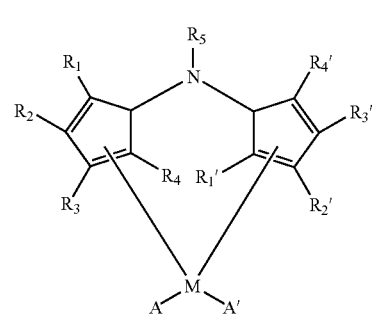

[Formula 5]

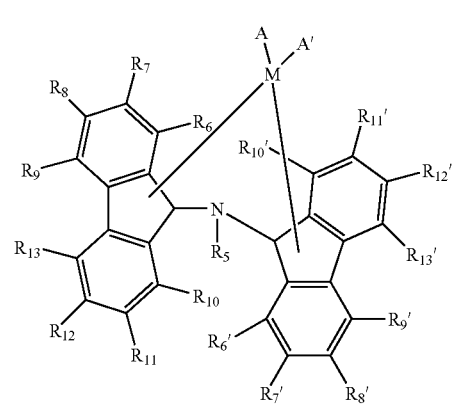

[Formula 6]

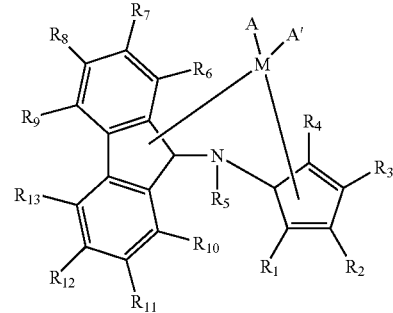

[Formula 7]

In Formula 5 to Formula 7, $R_1$ to $R_4$, $R_6$ to $R_{13}$, $R_1'$ to $R_4'$ and $R_6'$ to $R_{13}'$ may be the same or different from each other, and are each independently hydrogen; an alkyl group that is unsubstituted or substituted with a halo group and has 1 to 11 carbon atoms; an aryl group that is unsubstituted or substituted with a fluoroalkyl, nitro, sulfonate or halo group and has 6 to 20 carbon atoms; an arylalkyl group having 7 to 20 carbon atoms; an alkylaryl group having 7 to 20 carbon atoms; a nitro group; a sulfonate group; a siloxyl group; or —OSiZ₃, Z is phenyl; a straight- or branched-chained hydrocarbon having 1 to 4 carbon atoms; a hydrocarbylene group; or —(BO)$_z$Y, B is an alkylene group having 2 to 4 carbon atoms or an allylene group having 6 to 20 carbon atoms, Y is an alkyl group having 1 to 11 carbon atoms, a phenyl group, a biphenyl group, or a naphthyl group, and z is an integer in the range of 1 to 4, $R_5$ is an alkyl group having 1 to 11 carbon atoms; an aryl group that is unsubstituted or substituted with a fluoroalkyl, nitro, sulfonate or halo group and has 6 to 20 carbon atoms; an arylalkyl group having 7 to 20 carbon atoms; or an alkylaryl group having 7 to 20 carbon atoms, M is a Group 3 to 11 transition metal, and preferably a Group 4 transition metal such as titanium, zirconium, and hafnium, and A and A' are each independently Cl or Br.

In Formula 5 to Formula 7, it is preferable that $R_5$ is an arylalkyl group having 7 to 20 carbon atoms, and it is more preferable that $R_5$ is phenylethyl, but is not limited thereto.

In Formula 5 to Formula 7, in the case of when $R_1$ to $R_{13}$, $R_1'$ to $R_4'$ or $R_6'$ to $R_{13}'$ is an aryl group, it is preferable that the aryl group is a phenyl group, a biphenyl group, a naphthyl group, an anthracyl group or a phenanthracyl group.

In Formula 1 to Formula 7, examples of the straight- or branched-chained hydrocarbon having 1 to 4 carbon atoms include, but are not limited to a straight- or branched-chained alkyl group or alkenyl group having 1 to 4 carbon atoms.

In Formula 1 to Formula 7, examples of the hydrocarbylene include, but are not limited to a straight- or branched-chained alkyl group having 1 to 20 carbon atoms, a cycloalkyl group having 3 to 20 carbon atoms, a straight- or branched-chained alkenyl group having 2 to 20 carbon atoms, a cycloalkenyl group having 3 to 20 carbon atoms, an aryl group having 6 to 24 carbon atoms, or a arylalkyl group having 7 to 24 carbon atoms.

The metallocene catalyst according to the present invention is characterized in that a cyclopentadienyl group and/or a fluorenyl group are bridged with amine, and is advantageous in that an ethylene-alpha olefin copolymer is easily produced by using a catalyst composition including the same.

The method for producing the amine bridged metallocene catalyst according to an embodiment of the present invention may be represented by the following Reaction Equation 1.

[Reaction Equation 1]

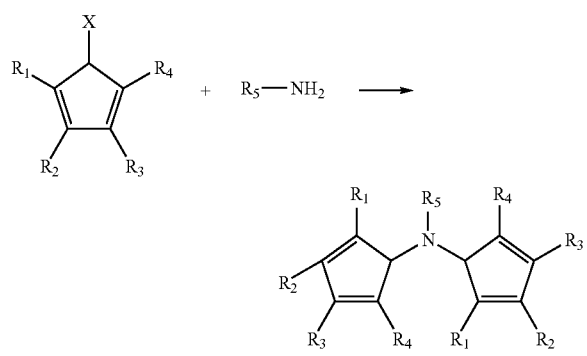

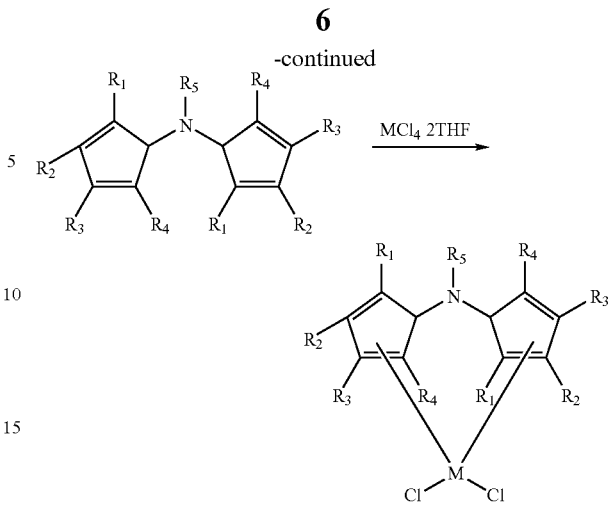

In the Reaction Equation 1, $R_1$, $R_2$, $R_3$, $R_4$, $R_5$, and M are the same as those defined in Formula 1 to Formula 4.

In addition, the present invention provides a method for producing an ethylene-alpha olefin copolymer, which comprises the steps of polymerizing ethylene and alpha olefin in the presence of a catalyst composition including the amine bridged metallocene catalyst.

The catalyst composition that comprises the amine bridged metallocene catalyst represented by Formula 5 to Formula 7 may further comprise one or more cocatalyst compounds of compounds of the following Formula 8 to Formula 10:

—[Al(R10)—O]$a$-     [Formula 8]

wherein R10 is each independently a halogen radical, a hydrocarbyl radical having 1 to 20 carbon atoms, a hydrocarbyl radical having 1 to 20 carbon atoms substituted with halogen, and a is an integer in the range of 2 or more;

D(R11)₃     [Formula 9]

wherein D is aluminium or boron, R11 is each independently a halogen radical, a hydrocarbyl radical having 1 to 20 carbon atoms, and a hydrocarbyl radical having 1 to 20 carbon atoms substituted with halogen,

[L-H]⁺[ZA₄]⁻ or [L]⁺[ZA₄]⁻     [Formula 10]

wherein L is a neutral or cationic Lewis acid; H is a hydrogen atom; Z is a Group 13 element such as B, Al, Ga, In, and Tl; A is each independently alkyl or aryl radical having 6 to 20 carbon atoms in which one or more hydrogen atoms are substituted with halogen, hydrocarbyl having 1 to 20 carbon atoms, alkoxy or phenoxy radical.

Among the cocatalyst compounds, the compound that is represented by Formula 8 and Formula 9 may be represented by an alkylating agent, and the compound that is represented by Formula 10 may be represented by an activating agent.

The catalyst composition is present in an activation state by the reaction between the amine bridged metallocene catalysts of Formula 5 to Formula 7 and the cocatalysts, and this may be referred to as an activation catalyst composition. However, since the fact that the catalyst composition is present in an activation state is known in the art, in the present specification, the term "activation catalyst composition" is not used.

The ethylene-alpha olefin copolymer according to the present invention may be produced by producing a catalyst composition using the metallocene catalyst of any one of Formula 5 to Formula 7 and one or more cocatalysts of compounds of Formula 8 to Formula 10, and polymerizing ethylene and alpha olefin using the same. The catalyst composition may be produced by using the following method for producing the composition.

First, there is provided a production method which comprises the steps of contacting the metallocene catalyst of any one of Formula 5 to Formula 7 and the compound that is represented by Formula 8 or Formula 9 to obtain a mixture; and adding a compound that is represented by Formula 10 to the mixture.

In addition, second, there is provided a method which comprises the steps of contacting the metallocene catalyst of any one of Formula 5 to Formula 7 and the compound that is represented by Formula 8 to produce a catalyst composition.

In addition, third, there is provided a method which comprises the steps of contacting the metallocene catalyst of any one of Formula 5 to Formula 7 and the compound that is represented by Formula 10 to produce a catalyst composition.

Among the production methods of the catalyst composition, in the case of the first method, the molar ratio of the compound that is represented by Formula 8 or Formula 9 to the metallocene catalyst of any one of Formula 5 to Formula 7 is in the range of preferably 1:2 to 1:5,000, more preferably 1:10 to 1:1,000, and most preferably 1:20 to 1:500. Next, the molar ratio of the compound that is represented by Formula 10 to the metallocene catalyst of any one of Formula 5 to Formula 7 is in the range of preferably 1:1 to 1:25, more preferably 1:1 to 1:10, and most preferably 1:2 to 1:5.

In the first method for producing the catalyst composition, in the case of when the molar ratio of the compound represented by Formula 8 and Formula 9 to the metallocene catalyst of any one of Formula 5 to Formula 7 is less than 1:2, since an amount of alkylating agent is very small, there is a problem in that alkylation of the metallocene catalyst is not completely performed, and in the case of when the molar ratio is more than 1:5,000, the alkylation of the metallocene catalyst is performed, but there is a problem in that by the side reaction between the remaining alkylating gent in an excessive amount and the activating agent of Formula 10, the activation of the alkylated metallocene catalyst is not completely performed. Next, in the case of when the ratio of the compound represented by Formula 10 to the metallocene catalyst of any one of Formula 5 to Formula 7 is less than 1:1, since the amount of the activating agent is relatively small, the activation of the metallocene catalyst is not completely performed, thus there is a problem in that the activity of the produced catalyst composition is reduced. In the case of when the ratio is more than 1:25, the activation of the metallocene catalyst is completely performed, but because of the remaining activating agent in an excessive amount, there are problems in that the cost of the catalyst composition is not competitive or the purity of the polymer is reduced.

Among the methods for producing the catalyst composition, in the case of the second method, the molar ratio of the compound represented by Formula 8 to the metallocene catalyst of any one of Formula 5 to Formula 7 is in the range of preferably 1:10 to 1:10,000, more preferably 1:100 to 1:5,000, and most preferably 1:500 to 1:2,000.

In the case of when the molar ratio is less than 1:10, since the amount of activating agent is relatively small, the activation of the metallocene catalyst is not completely performed, thus there is a problem in that the activity of the catalyst composition is reduced. In the case of when the molar ratio is more than 1:10,000, the activation of the metallocene catalyst is completely performed, but because of the remaining activating agent in an excessive amount, there are problems in that the cost of the catalyst composition is not competitive or the purity of the polymer is reduced.

Meanwhile, among the methods for producing the catalyst composition, in the case of the third method, the molar ratio of the compound represented by Formula 10 to the metallocene catalyst of any one of Formula 5 to Formula 7 is in the range of preferably 1:1 to 1:25, more preferably 1:1 to 1:10, and most preferably 1:2 to 1:5. In the case of when the molar ratio of the compound represented by Formula 10 to the metallocene catalyst is less than 1:1, the amount of activating agent is relatively small, and the activation of the metallocene catalyst is not completely performed, thus there is a problem in that the activity of the catalyst composition is reduced. In the case of when the molar ratio is more than 1:25, the activation of the metallocene catalyst is completely performed, but because of the remaining activating agent in an excessive amount, there are problems in that the cost of the catalyst composition is not competitive or the purity of the produced polymer is reduced.

When the catalyst composition is produced, hydrocarbon solvents such as pentane, hexane, heptane and the like or aromatic solvents such as benzene, toluene and the like may be used as a reaction solvent, but are not limited thereto and all solvents that are capable of being used in the art may be used.

In addition, the metallocene catalysts and the cocatalysts may be used in a form where it is carried in silica or alumina.

The compound that is represented by Formula 8 is not particularly limited as long as the compound is alkylaluminoxane, but preferable examples thereof include methylaluminoxane, ethylaluminoxane, isobutylaluminoxane, butylaluminoxane, and the particularly preferable compound is methylaluminoxane.

The alkyl metal compound that is represented by Formula 9 is not particularly limited, and preferable examples thereof include trimethylaluminium, triethylaluminium, triisobutylaluminium, tripropylaluminium, tributylaluminium, dimethylchloroaluminium, triisopropylaluminium, tri-s-butylaluminium, tricyclopentylaluminium, tripentylaluminium, triisopentylaluminium, trihexylaluminium, trioctylaluminium, ethyldimethylaluminium, methyldiethylaluminium, triphenylaluminium, tri-p-tollylaluminium, dimethylaluminium methoxide, dimethylaluminium ethoxide, trimethyl boron, triethyl boron, triisobutyl boron, tripropyl boron, tributyl boron and the like, and the particularly preferable compound is selected from trimethylaluminium, triethylaluminium, and triisobutylaluminium.

Examples of the compound that are represented by Formula 10 include triethyllammonium tetra(phenyl)boron, tributylammonium tetra(phenyl)boron, trimethyllammonium tetra(phenyl)boron, tripropylammonium tetra(phenyl) boron, trimethyllammonium tetra(p-tollyl)boron, trimethylammonium tetra(o,p-dimethylphenyl)boron, tributylammonium tetra(p-trifluoromethylphenyl)boron, trimethylammonium tetra(p-trifluoromethylphenyl)boron, tributylammonium tetra(pentafluorophenyl)boron, N,N-diethylamylidium tetra(phenyl)boron, N,N-diethylannylidium tetra(phenyl)boron, N,N-diethylannylinium tetra(pentafluorophenyl)boron, diethylammonium tetra(pentafluorophenyl) boron, triphenylphosphonium tetra(phenyl)boron, trimethylphosphonium tetra(phenyl)boron, triethylammonium tetra (phenyl)aluminium, tributylammonium tetra(phenyl) aluminium, trimethylammonium tetra(phenyl)aluminium, tripropylammonium tetra(phenyl)aluminium, trimethylammonium tetra(p-tollyl)aluminium, tripropylammonium tetra (p-tollyl)aluminium, triethylammonium tetra(o,p-dimethylphenyl)aluminium, tributylammonium tetra(p-trifluoromethylphenyl)aluminium, trimethylammonium tetra (p-trifluoromethylphenyl)aluminium, tributylammonium tetra(pentafluorophenyl)aluminium, N,N-diethylannyliniumtetra(phenyl)aluminium, N,N-diethylannyliniumtetra(phenyl)aluminium, N,N-diethylannyliniumtetra(pentafluorophenyl)aluminium, diethylammonium tetra(pentafluorophenyl)aluminium, triphenylphosphoniumtetra(phenyl)aluminium, trimethylphosphoniumtetra(phenyl)aluminium, triethylammonium tetra(phenyl)aluminium, tributylammonium tetra(phenyl)aluminium, trimethylammonium tetra(phenyl)boron, tripropylammonium tetra(phenyl)boron, trimethylammonium tetra(p-tollyl)boron, tripropylammonium tetra(p-tollyl)boron, triethylammonium tetra(o,p-dimethylphenyl)boron, trimethylammonium tetra(o,p-dimethylphenyl)boron, tributylammonium tetra(p-trifluoromethylphenyl)boron, trimethylammonium tetra(p-trifluoromethylphenyl)boron, tributylammonium tetra(pentafluorophenyl)boron, N,N-diethylannylinium tetra(phenyl)boron, N,N-diethylannylinium tetra(phenyl)boron, N,N-diethylannylinium tetra(pentafluorophenyl)boron, diethylammonium tetra(pentafluorophenyl)boron, triphenylphosphonium tetra(phenyl)boron, triphenylcarbonium tetra(p-trifluoromethylphenyl)boron, triphenylcarbonium tetra(pentafluorophenyl)boron, tritiltetra(pentafluorophenyl)boron and the like.

In the method for polymerizing the ethylene-alpha olefin copolymer according to the present invention, the catalyst composition may be injected by dissolving or diluting the catalyst composition in aliphatic hydrocarbon solvents having 5 to 12 carbon atoms that are useful in the polymerization process, for example, pentane, hexane, heptane, nonane, decane, an isomer thereof, and benzene, aromatic hydrocarbon solvents such as benzene, hydrocarbon solvents substituted by chlorine atoms such as dichloromethane, and chlorobenzene. It is preferable that the solvent is used while a small amount of water or air acting as a catalyst poison is removed by treating a small amount of alkylaluminium, and the cocatalyst may be further used.

Examples of the alpha olefin comonomer that is copolymerized in conjunction with ethylene by using the catalyst composition including the amine bridged metallocene catalyst include a diene olefin monomer or a triene olefin monomer having two or more double bonds. It is preferable that the alpha olefin comonomer is $C_3$-$C_{20}$ alpha olefin. Detailed examples of the alpha olefin comonomer include propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-itocene, norbornene, norbornadiene, ethylidenenorbornene, phenylnorbornene, vinylnorbornene, dicyclopentadiene, 1,4-butadiene, 1,5-pentadiene, 1,6-hexadiene, styrene, alpha-methylstyrene, divinylbenzene, 3-chloromethylstyrene and the like. These monomers may be used as a mixture of two or more species. One or more olefins that are selected from the group consisting of propylene, 1-butene, 1-pentene, 4-methyl-1-pentene, 1-hexene, 1-heptene, 1-octene, 1-decene, 1-undecene, 1-dodecene, 1-tetradecene, 1-hexadecene and 1-itocene are more preferable, any one selected from the group consisting of propylene, 1-butene, 1-hexene, and 4-methyl-1-pentene, and 1-octene is preferable, and 1-octene is even more preferable. At this time, as the polymerization solvent, it is particularly preferable to use n-hexane.

As the polymerization process of the ethylene-alpha olefin copolymer according to the present invention, a continuous solution process using the catalyst composition is most preferable. If the catalyst composition is used in conjunction with an inorganic carrier such as silica, it may be applied to a slurry or gas-phase process.

It is preferable that the reactor that is used in the polymerization process of the ethylene-alpha olefin copolymer is a continuous stirred reactor (CSTR) or a continuous plug flow reactor (PFR). In the production process of the ethylene-alpha olefin copolymer, it is preferable that two or more reactors are aligned in series or parallel. In addition, it is preferable that in the production process of the ethylene-alpha olefin copolymer, a separator for continuously separating the solvent and unreacted monomers from the reaction mixture is additionally provided.

The weight average molecular weight of the ethylene-alpha olefin copolymer is in the range of preferably 50,000 to 1,000,000, and more preferably 100,000 to 500,000. In addition, the molecular weight distribution of the ethylene-alpha olefin copolymer is in the range of preferably 2.0 to 6.0, and more preferably 2.5 to 5.0.

In addition, in the ethylene-alpha olefin copolymer, the degree of copolymerization of alpha olefin is in the range of preferably 1.0 to 20 mol % and more preferably 4.0 to 15 mol %.

MODE FOR THE INVENTION

A better understanding of the present invention may be obtained in light of the following Examples which are set forth to illustrate, but are not to be construed to limit the present invention.

EXAMPLE

Example 1

9-bromofluorene (9.80 g, 40 mmol) were dissolved in 150 mL of $CH_3CN$ and agitated for 1 hour while being purged using nitrogen. After phenethylamine (2.42 g, 20 mmol) was slowly dropped, the temperature was increased to 50° C. and it was heated while being agitated for 12 hours. After the reaction was finished, 100 mL of distilled water was added thereto and agitated, it was extracted by using 250 mL of diethyl ether twice, and normal hexane was removed through distillation at reduced pressure to obtain 7.64 g (1.7 mmol, 85%) of product. The purification was performed by using the column chromatography (solvent: normal hexane).

$^1$H NMR: 7.77-7.10 (23H), 5.03 (2H), 3.05 (2H), 2.89 (2H)
$^{13}$C NMR: 154.61, 140.86, 140.25, 128.97, 128.25, 128.08, 127.13, 126.50, 125.98, 119.83, 64.51, 48.99, 35.12

1.13 g (10 mmol) of the obtained product was dissolved in 15 mL of toluene, and cooled to −65° C. After 2 mL of BuLi (5 mmol, 2.5 M soln. In Hexane) was slowly added to the reaction mixture that was agitated, if the addition was finished, the temperature of the reaction mixture was slowly increased to room temperature, and agitated for 1 hour. 0.94 g of $ZrCl_4$ 2THF (2.5 mmol) was dissolved in 10 mL of toluene, controlled at −15° C., and added to the above reaction mixture. While the reaction temperature was maintained at room temperature, they were reacted with each other for 6 hours. After the solvent was removed under a vacuum, $CH_2Cl_2$ was added thereto, and filtered, and the solvent was removed under a vacuum. Through the recrystallization, the pure metallocene compound was obtained (0.95 g, 56%).

$^1$H NMR: 7.70-7.04 (23H), 5.22 (2H), 2.99 (2H), 2.81 (2H)
$^{13}$C NMR: 153.16, 141.68, 139.52, 128.79, 127.25, 126.80, 126.31, 126.05, 125.89, 120.38, 73.19, 50.71, 36.54

The structure of the metallocene compound that was produced according to Example 1 may be represented by the following Formula 11.

[Formula 11]

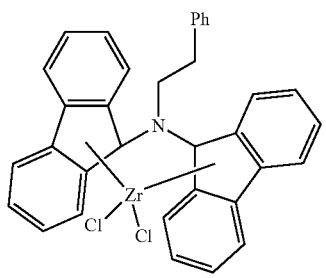

Example 2

In the flask that was purged with nitrogen, cyclopentadienyl thallium (1.85 g, 7.0 mmol) and recrystallized N-bromosuccinimide (0.925 g, 5.2 mmol) were put into $CCl_4$ (30 mL), controlled to 0° C., and agitated for 45 min. Through the cold suction flask at 0° C., they were filtered, 40 mL of $CH_3CN$ was put, phenethylamine (0.31 g, 2.5 mmol) was added thereto, and the temperature was slowly increased to normal temperature. After the agitation was performed for 4 hours, 30 mL of distilled water was put, and extracted with 40 mL of diethyl ether twice, and the solvent was distilled at reduced pressure to obtain 0.558 g (2.26 mmol, 90%).

$^1$H NMR: 7.31-7.12 (5H), 6.42-5.95 (8H), 4.19 (2H), 2.85 (2H), 2.70 (2H)

$^{13}$C NMR: 140.91, 138.42, 137.56, 130.79, 128.52, 127.80, 126.71, 125.65, 125.09, 117.98, 59.37, 50.61, 34.85

0.370 g of the obtained product (1.5 mmol) was dissolved in 8 mL of toluene, and cooled to −65° C. After 1.2 mL of BuLi (3 mmol, 2.5 M soln. In Hexane) was slowly added to the reaction mixture that was agitated, if the addition was finished, the temperature of the reaction mixture was slowly increased to room temperature, and agitated for 1 hour. 0.565 g of $ZrCl_4$ 2THF (1.5 mmol) was dissolved in 3 mL of toluene, controlled at −15° C., and added to the above reaction mixture. While the reaction temperature was maintained at room temperature, they were reacted with each other for 6 hours. After the solvent was removed under a vacuum, $CH_2Cl_2$ was added thereto, and filtered, and the solvent was removed under a vacuum. Through the recrystallization, the pure metallocene compound was obtained (0.355 g, 58%).

$^1$H NMR: 7.50 (2H), 7.46 (1H), 7.29 (2H), 6.73-6.66 (4H), 5.98-5.86 (4H), 5.30 (2H), 2.97 (2H), 2.56 (2H)

$^{13}$C NMR: 139.13, 137.42, 137.10, 131.09, 130.85, 128.78, 127.61, 126.55, 124.90, 118.79, 67.35, 56.10, 38.54

The structure of the metallocene compound that was produced according to Example 2 may be represented by the following Formula 12.

[Formula 12]

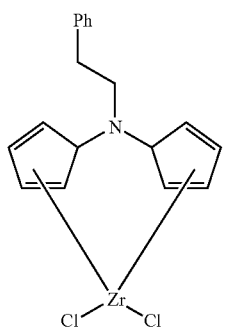

Example 3

In the flask that was purged with nitrogen, cyclopentadienyl thallium (1.85 g, 7.0 mmol) and recrystallized N-bromosuccinimide (0.925 g, 5.2 mmol) were put into $CCl_4$ (30 mL), controlled to 0° C., and agitated for 45 min. Through the cold suction flask at 0° C., they were filtered, 40 mL of $CH_3CN$ was put, cooled to −78° C., phenethylamine (0.74 g, 6.0 mmol) was added thereto, and agitated for 30 min. Subsequently, 9-bromofluorene (1.47 g, 6.0 mmol) was dissolved in 20 mL of $CH_3CN$, added to the reaction mixture, and agitated for 24 hours while the temperature was maintained at −78° C., 30 mL of distilled water was put, and extracted with 50 mL of diethyl ether twice, and the solvent was distilled at reduced pressure to obtain 1.22 g (3.49 mmol, 67%).

$^1$H NMR: 7.84-7.28 (8H), 7.22-7.10 (5H), 6.65-6.37 (4H), 5.06 (1H), 4.14 (1H), 2.69 (2H), 2.61 (2H)

$^{13}$C NMR: 141.91, 141.09, 139.51, 132.65, 131.83, 129.79, 128.52, 127.71, 126.80, 125.56, 125.17, 122.38, 67.95, 57.47, 51.16, 34.80.

0.524 g of the obtained product (1.5 mmol) was dissolved in 10 mL of toluene, and cooled to −65° C. After 1.2 mL of BuLi (3 mmol, 2.5 M soln. In Hexane) was slowly added to the reaction mixture that was agitated, if the addition was finished, the temperature of the reaction mixture was slowly increased to room temperature, and agitated for 1 hour. 0.565 g of $ZrCl_4$ 2THF (1.5 mmol) was dissolved in 3 mL of toluene, controlled at −15° C., and added to the above reaction mixture. While the reaction temperature was maintained at room temperature, they were reacted with each other for 6 hours. After the solvent was removed under a vacuum, $CH_2Cl_2$ was added thereto, and filtered, and the solvent was removed under a vacuum. Through the recrystallization, the pure metallocene compound was obtained (0.361 g, 47%).

$^1$H NMR: 7.78-7.72 (4H), 7.69-7.61 (4H), 7.30-7.22 (5H), 6.56-6.45 (2H), 6.36-6.30 (2H), 5.11 (1H), 4.25 (1H), 2.64 (2H), 2.57 (2H)

$^{13}$C NMR: 142.19, 141.90, 139.15, 133.26, 132.18, 130.87, 129.82, 128.17, 127.74, 125.65, 125.01, 123.23, 69.57, 59.74, 52.11, 33.48.

The structure of the metallocene compound that was produced according to Example 3 may be represented by the following Formula 13.

[Formula 13]

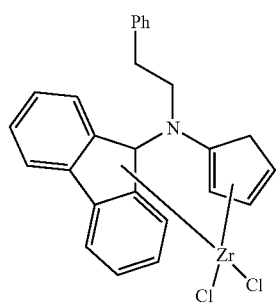

Example 4

In the flask that was purged with nitrogen, cyclopentadienyl thallium (2.24 g, 7.0 mmol) and recrystallized N-bromosuccinimide (0.889 g, 5.0 mmol) were put into $CCl_4$ (30 mL), controlled to 0° C., and agitated for 60 min. Through the cold suction flask at 0° C., they were filtered, 50 mL of $CH_3CN$ was put, cooled to −78° C., butylamine (0.48 g, 6.5 mmol) was added thereto, and agitated for 50 min. Subsequently, 9-bromofluorene (1.47 g, 6.0 mmol) was dissolved in 20 mL of $CH_3CN$, added to the reaction mixture, and agitated for 24 hours while the temperature was maintained at −78° C., 30 mL of distilled water was put, and extracted with 50 mL of diethyl ether twice, and the solvent was distilled at reduced pressure to obtain 0.91 g (2.55 mmol, 51%).

$^1$H NMR: 7.84-7.28 (8H), 5.04 (1H), 4.08 (1H), 2.40 (2H), 1.75 (12H), 1.40-1.30 (4H), 0.97 (3H)

$^{13}$C NMR: 141.23, 140.74, 134.26, 129.38, 128.92, 128.47, 126.08, 125.65, 67.79, 65.74, 50.11, 31.48, 20.53, 15.30, 14.06, 13.34.

0.533 g of the obtained product (1.5 mmol) was dissolved in 10 mL of toluene, and cooled to −65° C. After 1.2 mL of BuLi (3 mmol, 2.5 M soln. In Hexane) was slowly added to the reaction mixture that was agitated, if the addition was finished, the temperature of the reaction mixture was slowly increased to room temperature, and agitated for 1 hour. 0.565 g of $ZrCl_4$ 2THF (1.5 mmol) was dissolved in 3 mL of toluene, controlled at −15° C., and added to the above reaction mixture. While the reaction temperature was maintained at room temperature, they were reacted with each other for 6 hours. After the solvent was removed under a vacuum, $CH_2Cl_2$ was added thereto, and filtered, and the solvent was removed under a vacuum. Through the recrystallization, the pure metallocene compound was obtained (0.342 g, 44%).

$^1$H NMR: 7.78-7.74 (4H), 7.58-7.49 (4H), 5.40 (1H), 4.36 (1H), 2.54 (2H), 1.72 (12H), 1.41-1.31 (4H), 0.99 (3H)

$^{13}$C NMR: 141.89, 141.07, 135.62, 130.83, 129.92, 129.25, 126.78, 126.56, 69.77, 67.45, 51.01, 31.84, 20.35, 15.03, 14.60, 13.43.

The structure of the metallocene compound that was produced according to Example 4 may be represented by the following Formula 14.

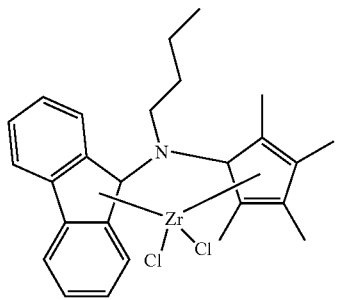

[Formula 14]

Experimental Example 1

Copolymerization of Ethylene/1-Hexene by Using the Produced Catalyst

The copolymerization of ethylene/1-hexene by using the produced catalyst that was produced in Example 1 was carried out by using the following method. Into the pressure reactor under a high pure argon atmosphere, 250 mL of purified toluene and 2.93 mL of 10 wt % methylaluminoxane toluene solution as the cocatalyst (manufactured by Albemarle, Co., Ltd.) were injected and heated to the temperature of 60° C. 5 mL of toluene solution (5 mmol of Zr) where the metallocene polymerization catalyst obtained in Example 1 was dissolved and 10 mL of 1-hexene solution were added thereto and agitated. After that, ethylene of 50 psig was applied to the reactor to start the polymerization. After they were agitated for 30 min, the agitation was stopped and the pressure was released. To the polymerization reactor, the 10 wt % hydrochloric acid-ethanol solution was added to stop the polymerization, and filtered to obtain the white solid precipitate. The precipitate was washed with ethanol, and dried at 60° C. in the vacuum oven for 24 hours to produce the final ethylene/1-hexene copolymer. Mw of the produced copolymer was 349×10$^3$, Mw/Mn was 2.6, Tm was 118.7° C., and the amount was 1.6 g. The degree of copolymerization of 1-hexene was 8.3 mol %.

Experimental Example 2

Copolymerization of Ethylene/1-Hexene by Using the Produced Catalyst

The copolymerization of ethylene/1-hexene was performed by using the catalyst that was produced in Example 2 according to the same method as Experimental Example 1. Mw of the produced copolymer was 194×10$^3$, Mw/Mn was 4.3, Tm was 124.8° C., and the amount was 1.4 g. The degree of copolymerization of 1-hexene was 4.9 mol %.

Experimental Example 3

Copolymerization of Ethylene/1-Hexene by Using the Produced Catalyst

The copolymerization of ethylene/1-hexene was performed by using the catalyst that was produced in Example 3 according to the same method as Experimental Example 1. Mw of the produced copolymer was 276×10$^3$, Mw/Mn was 3.2, Tm was 117.4° C., and the amount was 2.6 g. The degree of copolymerization of 1-hexene was 9.4 mol %.

Experimental Example 4

Copolymerization of Ethylene/1-Hexene by Using the Produced Catalyst

The copolymerization of ethylene/1-hexene was performed by using the catalyst that was produced in Example 4 according to the same method as Experimental Example 1. Mw of the produced copolymer was 423×10$^3$, Mw/Mn was 3.6, Tm was 114.1° C., and the amount was 2.2 g. The degree of copolymerization of 1-hexene was 12.7 mol %.

The invention claimed is:

1. A method for producing a metallocene catalyst, the method comprising the steps of:
reacting one or more of compounds that are represented by the following Formula 1 and Formula 2 with a compound that is represented by the following Formula 3 to bridge them with nitrogen; and
reacting them with a compound that is represented by the following Formula 4 to coordinate them:

[Formula 1]

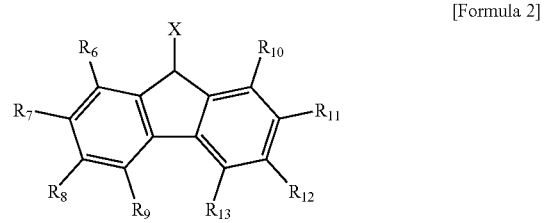

[Formula 2]

wherein $R_1$, $R_2$, $R_3$, $R_4$, $R_6$, $R_7$, $R_8$, $R_9$, $R_{10}$, $R_{11}$, $R_{12}$ and $R_{13}$ may be the same or different from each other, and are each independently hydrogen; an alkyl group that is unsubstituted or substituted with a halo group and has 1 to 11 carbon atoms; an aryl group that is unsubstituted or substituted with a fluoroalkyl, nitro, sulfonate or halo group and has 6 to 20 carbon atoms; an arylalkyl group having 7 to 20 carbon atoms; an alkylaryl group having 7 to 20 carbon atoms; a nitro group; a sulfonate group; a siloxyl group; or —$OSiZ_3$, Z is phenyl; a straight- or branched-chained hydrocarbon having 1 to 4 carbon atoms; a hydrocarbylene group; or —$(BO)_zY$, B is an alkylene group having 2 to 4 carbon atoms or an allylene group having 6 to 20 carbon atoms, Y is an alkyl group having 1 to 11 carbon atoms, a phenyl group, a biphenyl group, or a naphthyl group, and z is an integer in the range of 1 to 4, X is a halogen atom or a thallium atom,

  [Formula 3]

wherein $R_5$ is an alkyl group having 1 to 11 carbon atoms; an aryl group that is unsubstituted or substituted with a fluoroalkyl, nitro, sulfonate or halo group and has 6 to 20 carbon atoms; an arylalkyl group having 7 to 20 carbon atoms; or an alkylaryl group having 7 to 20 carbon atoms,

  [Formula 4]

wherein

M is a Group 3 to 11 transition metal,

A is Cl or Br,

X is an integer in the range of 2 to 4, r is an integer in the range of 1 to 4, and Q is THF (tetrahydrofuran), $Et_2O$ (diethylether), or DME (Dimethyl Ether).

2. The method for producing a metallocene catalyst according to claim 1, wherein $R_5$ of Formula 3 is phenylethyl.

3. The method for producing a metallocene catalyst according to claim 1, wherein M of Formula 3 is titanium, zirconium or hafnium.

4. The method for producing a metallocene catalyst according to claim 1, wherein in the case of when $R_1$, $R_2$, $R_3$, $R_4$, $R_5$, $R_6$, $R_7$, $R_8$, $R_9$, $R_{10}$, $R_{11}$, $R_{12}$ or $R_{13}$ of Formula 1 to Formula 3 is an aryl group, the aryl group is a phenyl group, a biphenyl group, a naphthyl group, an anthracyl group or a phenanthracyl group.

5. The method for producing a metallocene catalyst according to claim 1, wherein the metallocene catalyst is represented by any one of the following Formula 5 to Formula 7:

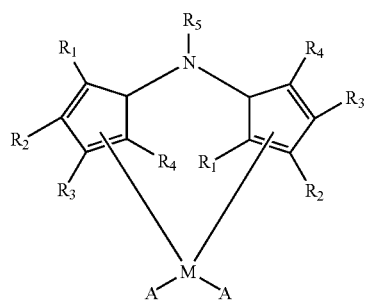  [Formula 5]

-continued

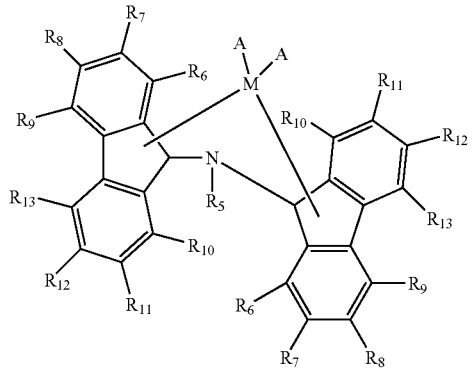  [Formula 6]

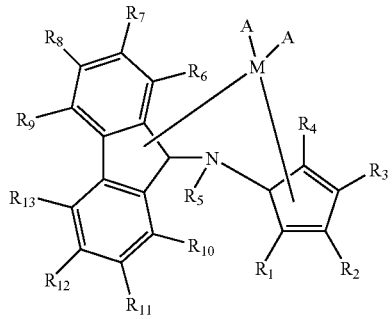  [Formula 7]

wherein $R_1$, $R_2$, $R_3$, $R_4$, $R_6$, $R_7$, $R_8$, $R_9$, $R_{10}$, $R_{11}$, $R_{12}$ and $R_{13}$ may be the same or different from each other, and are each independently hydrogen; an alkyl group that is unsubstituted or substituted with a halo group and has 1 to 11 carbon atoms; an aryl group that is unsubstituted or substituted with a fluoroalkyl, nitro, sulfonate or halo group and has 6 to 20 carbon atoms; an arylalkyl group having 7 to 20 carbon atoms; an alkylaryl group having 7 to 20 carbon atoms; a nitro group; a sulfonate group; a siloxyl group; or —$OSiZ_3$, Z is phenyl; a straight- or branched-chained hydrocarbon having 1 to 4 carbon atoms; a hydrocarbylene group; or —$(BO)_zY$, B is an alkylene group having 2 to 4 carbon atoms or an allylene group having 6 to 20 carbon atoms, Y is an alkyl group having 1 to 11 carbon atoms, a phenyl group, a biphenyl group, or a naphthyl group, and z is an integer in the range of 1 to 4, $R_5$ is an alkyl group having 1 to 11 carbon atoms; an aryl group that is unsubstituted or substituted with a fluoroalkyl, nitro, sulfonate or halo group and has 6 to 20 carbon atoms; an arylalkyl group having 7 to 20 carbon atoms; or an alkylaryl group having 7 to 20 carbon atoms, M is a Group 3 to 11 transition metal, and A is Cl or Br.

6. A metallocene catalyst that is represented by the following Formula 6:

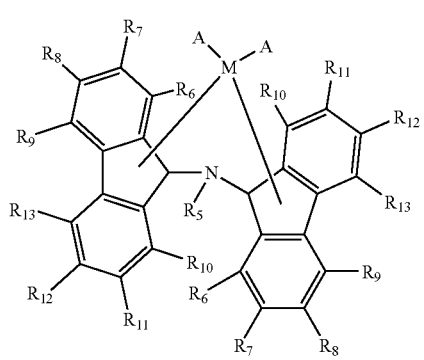  [Formula 6]

wherein $R_6$, $R_7$, $R_8$, $R_9$, $R_{10}$, $R_{11}$, $R_{12}$ and $R_{13}$ may be the same or different from each other, and are each independently hydrogen; an alkyl group that is unsubstituted or substituted with a halo group and has 1 to 11 carbon atoms; an aryl group that is unsubstituted or substituted with a fluoroalkyl, nitro, sulfonate or halo group and has 6 to 20 carbon atoms; an arylalkyl group having 7 to 20 carbon atoms; an alkylaryl group having 7 to 20 carbon atoms; a nitro group; a sulfonate group; a siloxyl group; or —$OSiZ_3$, Z is phenyl; a straight- or branched-chained hydrocarbon having 1 to 4 carbon atoms; a hydrocarbylene group; or —$(BO)_zY$, B is an alkylene group having 2 to 4 carbon atoms or an allylene group having 6 to 20 carbon atoms, Y is an alkyl group having 1 to 11 carbon atoms, a phenyl group, a biphenyl group, or a naphthyl group, and z is an integer in the range of 1 to 4, $R_5$ is an alkyl group having 1 to 11 carbon atoms; an aryl group that is unsubstituted or substituted with a fluoroalkyl, nitro, sulfonate or halo group and has 6 to 20 carbon atoms; an arylalkyl group having 7 to 20 carbon atoms; or an alkylaryl group having 7 to 20 carbon atoms, M is a Group 3 to 11 transition metal, and A is Cl or Br.

7. A metallocene catalyst that is represented by the following Formula 7:

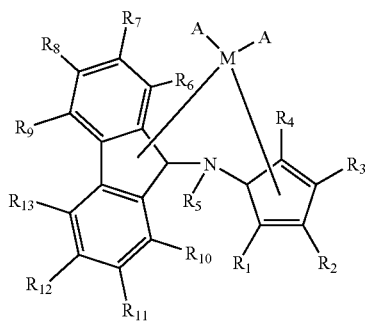

[Formula 7]

wherein $R_1$, $R_2$, $R_3$, $R_4$, $R_6$, $R_7$, $R_8$, $R_9$, $R_{10}$, $R_{11}$, $R_{12}$ and $R_{13}$ may be the same or different from each other, and are each independently hydrogen; an alkyl group that is unsubstituted or substituted with a halo group and has 1 to 11 carbon atoms; an aryl group that is unsubstituted or substituted with a fluoroalkyl, nitro, sulfonate or halo group and has 6 to 20 carbon atoms; an arylalkyl group having 7 to 20 carbon atoms; an alkylaryl group having 7 to 20 carbon atoms; a nitro group; a sulfonate group; a siloxyl group; or —$OSiZ_3$, Z is phenyl; a straight- or branched-chained hydrocarbon having 1 to 4 carbon atoms; a hydrocarbylene group; or —$(BO)_zY$, B is an alkylene group having 2 to 4 carbon atoms or an allylene group having 6 to 20 carbon atoms, Y is an alkyl group having 1 to 11 carbon atoms, a phenyl group, a biphenyl group, or a naphthyl group, and z is an integer in the range of 1 to 4, $R_5$ is an alkyl group having 1 to 11 carbon atoms; an aryl group that is unsubstituted or substituted with a fluoroalkyl, nitro, sulfonate or halo group and has 6 to 20 carbon atoms; an arylalkyl group having 7 to 20 carbon atoms; or an alkylaryl group having 7 to 20 carbon atoms, M is a Group 3 to 11 transition metal, and A is Cl or Br.

8. The metallocene catalyst according to claim 6, wherein $R_5$ of Formula 6 is phenylethyl.

9. The metallocene catalyst according to claim 7, wherein $R_5$ of Formula 7 is phenylethyl.

10. The metallocene catalyst according to claim 6, wherein in the case of when $R_1$, $R_2$, $R_3$, $R_4$, $R_5$, $R_6$, $R_7$, $R_8$, $R_9$, $R_{10}$, $R_{11}$, $R_{12}$ or $R_{13}$ of Formula 6 is an aryl group, the aryl group is a phenyl group, a biphenyl group, a naphthyl group, an anthracyl group or a phenanthracyl group.

11. The metallocene catalyst according to claim 7, wherein in the case of when $R_1$, $R_2$, $R_3$, $R_4$, $R_5$, $R_6$, $R_7$, $R_8$, $R_9$, $R_{10}$, $R_{11}$, $R_{12}$ or $R_{13}$ of Formula 7 is an aryl group, the aryl group is a phenyl group, a biphenyl group, a naphthyl group, an anthracyl group or a phenanthracyl group.

* * * * *